US007689860B2

(12) United States Patent
Zarnke et al.

(10) Patent No.: US 7,689,860 B2
(45) Date of Patent: Mar. 30, 2010

(54) INTEGRATING CONTENT-LADEN MEDIA WITH STORAGE SYSTEM

(75) Inventors: Robert Zarnke, Waterloo (CA); Michael A. Malcolm, Aspen, CO (US)

(73) Assignee: Kaleidescape, Inc., Sunnyvale, CA (US)

( * ) Notice: Subject to any disclaimer, the term of this patent is extended or adjusted under 35 U.S.C. 154(b) by 0 days.

(21) Appl. No.: 11/890,280

(22) Filed: Aug. 3, 2007

(65) Prior Publication Data

US 2008/0148096 A1 Jun. 19, 2008

Related U.S. Application Data

(63) Continuation of application No. 10/778,934, filed on Feb. 13, 2004, now Pat. No. 7,257,732.

(51) Int. Cl.
*G06F 11/00* (2006.01)

(52) U.S. Cl. ........................................................ 714/6

(58) Field of Classification Search .................. 714/5, 714/6, 7; 711/114
See application file for complete search history.

(56) References Cited

U.S. PATENT DOCUMENTS

| | | | | |
|---|---|---|---|---|
| 5,392,244 A * | 2/1995 | Jacobson et al. | ............. | 711/114 |
| 5,457,791 A * | 10/1995 | Matsumoto et al. | ............. | 714/5 |
| 5,615,352 A * | 3/1997 | Jacobson et al. | ............. | 711/114 |
| 5,805,799 A * | 9/1998 | Fredrickson et al. | ........... | 714/52 |
| 5,991,804 A * | 11/1999 | Bolosky et al. | ............. | 709/221 |
| 6,035,373 A * | 3/2000 | Iwata | .......................... | 711/114 |
| 6,052,759 A * | 4/2000 | Stallmo et al. | ............... | 711/114 |
| 6,092,169 A * | 7/2000 | Murthy et al. | ............... | 711/170 |
| 6,275,897 B1 * | 8/2001 | Bachmat | ...................... | 711/114 |
| 6,304,942 B1 * | 10/2001 | DeKoning | ................... | 711/114 |
| 6,473,867 B2 * | 10/2002 | Yamamoto et al. | ............. | 714/6 |
| 6,701,391 B1 * | 3/2004 | Ayat et al. | ...................... | 710/34 |
| 6,799,224 B1 * | 9/2004 | Dellacona | ....................... | 714/2 |
| 6,851,082 B1 * | 2/2005 | Corbett | ........................ | 714/770 |
| 6,889,302 B2 * | 5/2005 | Gibble et al. | ............... | 711/170 |
| 7,032,093 B1 * | 4/2006 | Cameron | ..................... | 711/170 |
| 7,139,880 B2 * | 11/2006 | Kaneko et al. | ............... | 711/141 |
| 7,181,582 B2 * | 2/2007 | Cochran | ...................... | 711/162 |
| 7,260,739 B2 * | 8/2007 | Burton et al. | ................... | 714/6 |
| 7,310,743 B1 * | 12/2007 | Gagne et al. | .................... | 714/6 |
| 7,447,837 B2 * | 11/2008 | Watanabe | .................... | 711/114 |
| 2002/0178192 A1 * | 11/2002 | Namioka | ...................... | 707/536 |
| 2004/0268017 A1 * | 12/2004 | Uzrad-Nali et al. | ............ | 711/1 |
| 2005/0005191 A1 * | 1/2005 | Judd | ............................. | 714/5 |
| 2005/0091452 A1 * | 4/2005 | Chen et al. | ................... | 711/114 |
| 2005/0188280 A1 * | 8/2005 | Ali | ............................... | 714/42 |

* cited by examiner

*Primary Examiner*—Robert Beausoliel
*Assistant Examiner*—Amine Riad

(57) ABSTRACT

Integrating content into a storage system with substantially immediate access to that content. Providing high reliability and relatively easy operation with a storage system using redundant information for error correction. Having the storage system perform a "virtual write," including substantially all steps associated with writing to the media to be integrated, except for the step of actually writing data to that media, including rewriting information relating to used disk blocks, and including rewriting any redundant information maintained by the storage system. Integrating the new physical media into the storage system, including accessing content already present on that media, free space already present on that media, and reading and writing that media. Recovering from errors during integration.

29 Claims, 2 Drawing Sheets

INTEGRATING CONTENT-LADEN MEDIA WITH STORAGE SYSTEM

CROSS-REFERENCE TO RELATED APPLICATIONS

This application is a continuation of application Ser. No. 10/778,934, filed Feb. 13, 2004 in the name of the same inventors, issued on Aug. 14, 2007 as U.S. Pat. No. 7,257,732 B2, hereby incorporated by reference as if fully set forth herein.

BACKGROUND OF THE INVENTION

1. Field of the Invention

The invention relates to integrating content-laden media with a storage system, such as for example integrating a disk drive already including digital content with a RAID storage subsystem.

2. Related Art

Distribution of digital content representing media streams, such as for example movies, is subject to several problems. One problem is that digital content representing an individual movie, or a set of movies, can include a relatively large amount of data. In known systems, receiving that digital content involves at least two significant delays: (1) a first delay between when the digital content is requested and when it is actually received, and (2) a second delay between when the digital content is received and when it is actually available for use. The second delay poses a particular problem in that, while users might be used to waiting for delivery of a product, it is more annoying to have to wait, again, to use that product once it has been delivered and received. It would be advantageous to be able to distribute digital content, particularly digital content representing media streams, without substantial time delay in receiving that content, and especially without substantial time delay in being able to use that content once it is received.

One method of distributing digital content is to physically send a copy of that content on physical media, such as for example a DVD or magnetic disk. While this method generally achieves the goal of sending a relatively large amount of content in a relatively convenient package, it is subject to the drawback that it involves either (1) substantial complexity and possible awkwardness if that content is not integrated into the file system, or (2) integrating the content into a file system or other storage system when the content is to be used. For a first example, if that content is maintained on the original DVD or magnetic disk on which it was received, it would involve the storage system tracking what content is on what media, rather than advantageously leaving that task to a set of lower level operations for reading and writing physical media. For a second example, if that content is maintained off-line, the user might be involved in physically adding that content to what is accessible by the storage system. For a third example, even if that content is maintained on-line, it might still take substantial time to access it, such as for example when using a DVD carousel.

If that content is not integrated into the file system, as described in option 1 above, that content remains on its own separate physical media. Systems using this technique are subject to several drawbacks: (A) The storage system is not generally able to avail itself of redundant information techniques to protect that content against error or loss. (B) It would either involve permanently maintaining multiple namespaces for content, such as for example one for each such disk, or involve the storage system tracking what content is on what media, rather than advantageously leaving that task to a set of lower level operations for maintaining portions of the storage namespace on multiple physical media. (C) It might pose a problem if there were more such disks than the storage system was able to physically accommodate. For example, a storage system might involve significant extra effort if more than 12 disk drives or more than several hundred DVD's were used.

If that content is integrated into the file system, as described in option 2 above, one method of integrating that content is to copy the data from the physical media used to transport it to a different set of physical media used to maintain a file system. While this method is effective in providing the content for use with the file system, it is subject to several drawbacks: (A) It can take a relatively long time to copy the data. For example, a 350 Gigabyte disk might take several hours to copy using known disk drives. (B) Also, it might involve providing at least one empty disk drive slot from which to copy the data.

Accordingly, it would be advantageous to provide a technique for integrating content that is not subject to drawbacks of the known art.

SUMMARY OF THE INVENTION

The invention provides a method and system capable of integrating content into a storage system with substantially immediate access to that content. The invention also has the advantages of providing high reliability, and of providing relatively easy operation with a storage system using redundant information for error correction.

In one embodiment, the method includes having the storage system perform substantially all steps associated with writing to the media to be integrated, except for the step of actually writing data to that media, herein called a "virtual write" to that media. A virtual write can include rewriting information relating to used disk blocks, with the effect of designating the newly virtually-written block as in use, and rewriting any redundant information maintained by the storage system, with the effect of being able to recover the newly virtually-written block from that redundant information.

The method also includes integrating the new physical media into the storage system, with the effect that the storage system can perform its operations with regard to that physical media. For some examples, not intended to be limiting in any way, the storage system can access content already present on that media, the storage system can read and write that media without the possibility of creating storage system inconsistencies, and the file system can perform file system operations on that media, such as for example creating or deleting files, extending or truncating files, creating or deleting directories, adding or removing directory entries, allocating free space already present on that media, combinations or conjunctions of the above, and the like.

In one embodiment, the method includes recovering from errors during integration, with the effect that the storage system can concurrently access that media during integration, without the possibility of creating storage system inconsistencies.

In various embodiments, the invention contemplates using storage systems in which the redundant information includes parity information, either maintained on a designated parity disk, such as for example in a RAID-4 system, or distributed across more than one disk. For a first example, not intended to be limiting in any way, parity might be distributed across more than one original data disk 110 (with the effect that the original data disks 110 include parity information otherwise described herein to be on the parity disk 120), while one or more new disks 130 include only the new content included in disk blocks 131 for the new disks 130. For a second example, parity might be written to one or more new disks 130 as the storage system 100 proceeds with its normal operation after integrating each new disk 130 into the storage system 100. The invention also contemplates using storage systems in which the redundant information includes more than one bit of error-correcting information.

After reading this application, those skilled in the art would recognize that the techniques described herein provide an enabling technology, with the effect that heretofore advantageous features can be provided that heretofore were substantially infeasible.

DETAILED DESCRIPTION OF THE PREFERRED EMBODIMENT

Figure 1:
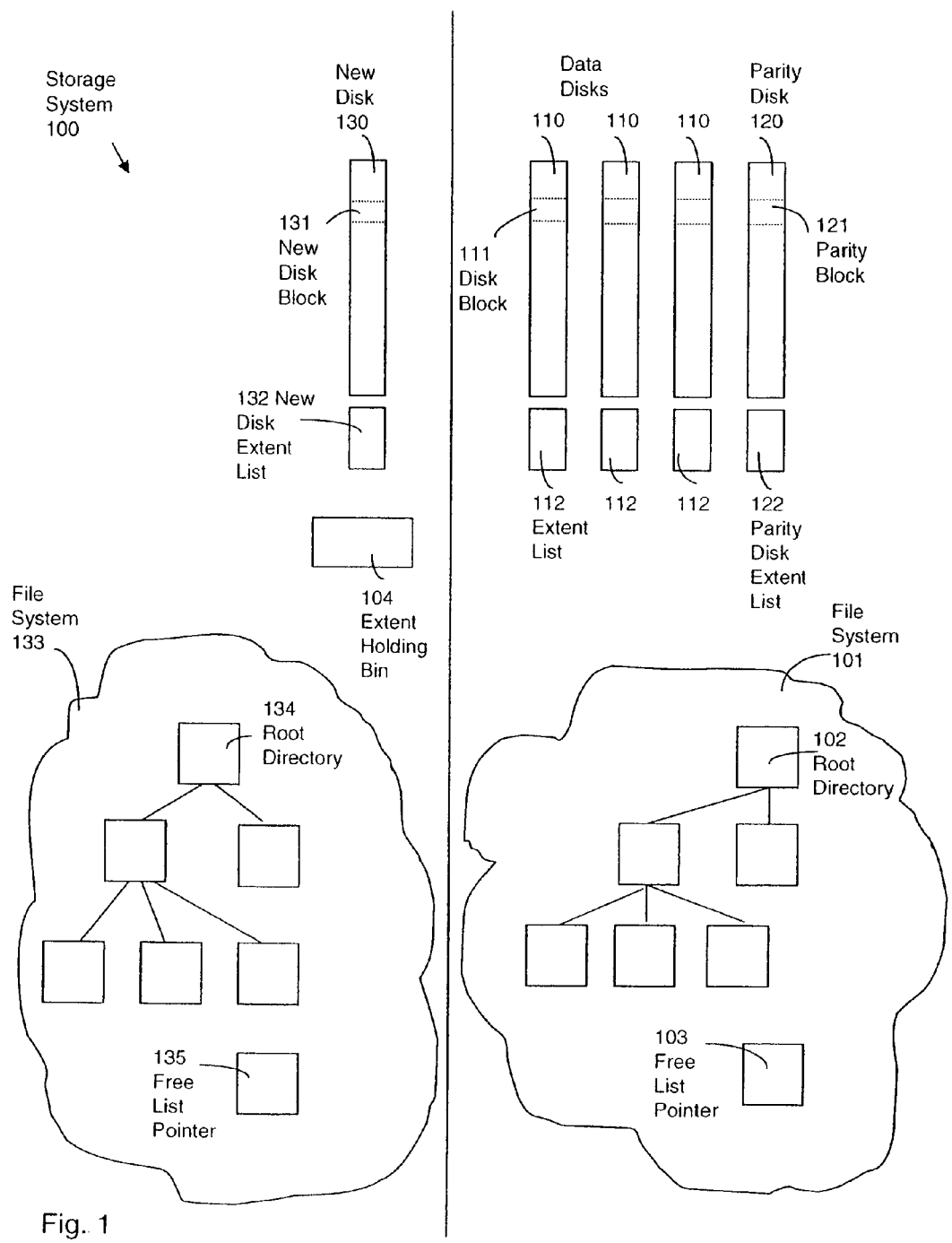
FIG. 1 shows a block diagram of a storage system and a new disk to be integrated into the storage system.

Preferred embodiments of the invention are described herein, including preferred device coupling, device functionality, and process steps. After reading this application, those skilled in the art would realize that embodiments of the invention might be implemented using a variety of other techniques not specifically described herein, without undue experimentation or further invention, and that such other techniques would be within the scope and spirit of the invention.

DEFINITIONS

The general meaning of each of these terms is intended to be illustrative and in no way limiting.

The phrase "media stream" describes information intended for presentation in a sequence, such as motion pictures including a sequence of frames or fields, or such as audio including a sequence of sounds. As used herein, the phrase "media stream" has a broader meaning than the standard meaning for "streaming media," (of sound and pictures that are transmitted continuously using packets and that start to play before all of the content arrives). Rather, as described herein, there is no particular requirement that media streams must be delivered continuously. Also as described herein, media streams can refer to other information for presentation, such as for example animation or sound, as well as to still media, such as for example pictures or illustrations, and also to databases and other collections of information.

The phrase "digital content" describes data in a digital format, intended to represent media streams or other information for presentation to an end viewer. "Digital content" is distinguished from packaging information, such as for example message header information. For the two phrases "digital content" and "media stream," the former describes a selected encoding of the latter, while the latter describes a result of presenting any encoding thereof.

The phrases "error correcting information," "error detecting information," "parity information," and "redundant information" generally describe any information used in conjunction with data to detect cases where that data has been lost, in part or wholly, and cases where that data can be recovered, in part or wholly. "Digital content" is distinguished from redundant information, such as for example parity information. The former might be sent with only a CRC or secure hash to determine that the digital content has not been altered or lost, while the latter is generally for use in conjunction with the digital content to dynamically determine whether any of the digital content has been lost, and if so, to possibly recover it. For one example, not intended to be limiting in any way, when used in combination with the disk's own error detection techniques, parity is a specific example of an error correcting code.

The phrase "storage system" generally describes any system or object within a system (where an "object" is meant in a generic design sense) that includes a set of blocks on physical media. In most storage systems, storage blocks are each uniquely identifiable, with the effect that the storage system can specify which storage block is to be read or written. In preferred embodiments, there is more than one device providing the physical media, such as for example a set of (magnetic or optical) disk drives.

The phrase "extent list" generally describes an object within a storage system, each extent list being associated with a disk, that includes a description of which blocks have been written to an individual disk, that is, are "in use" as described herein. In one embodiment, such as in storage systems provided by Kaleidescape, each disk has an associated extent list. In such embodiments, each disk also has an associated holding bin, capable of maintaining a second extent list, such as for example maintained when integrating that disk into the storage system. In such embodiments, consistency of the extent list with the actual disk blocks is maintained persistently across system errors and other failures. For one example, not intended to be limiting in any way, in systems where write operations are performed episodically, with a recovery technique to account for those write operations that only partially complete, the extent list can be maintained consistently and persistently.

The phrase "redundant storage system" generally describes any storage system in which redundant information is maintained in addition to actual data. In one embodiment, such as in storage systems provided by Kaleidescape, storage blocks might include actual data or parity information. Although in such embodiments, parity information is often maintained on only a single disk, this is not required in the context of the invention. In such embodiments, consistency of the redundant information with the actual data is maintained persistently across system errors and other failures. For one example, not intended to be limiting in any way, in systems where write operations are performed episodically, with a recovery technique to account for those write operations that only partially complete, the redundant information can be maintained consistently and persistently.

The phrase "file system" generally describes any system or object within a system (such as for example making use of the storage system) including a set of separately identifiable data units, called "files," each possibly more than one data block in size. In one embodiment, such as in systems provided by Kaleidescape, the file system includes a hierarchical structure of directories and files, but this is not required in the context of the invention. In such embodiments, the file system provides operations for creating, deleting, reading from, and writing to, directories and files. In such embodiments, the file system also includes a set of free storage blocks, sometimes herein called a "free list," which is also maintained consistently with the files and persistently across system errors and other failures.

The phrase "content disk" generally describes a single disk including one or more file systems having actual data maintained therein, although in a preferred embodiment, in practice there would be only one such file system. In alternative embodiments, there might a set of such disks which collectively include content to be added contained in a storage system that spans several disks, although in a preferred embodiment, in practice there would be only one such contact disk.

The scope and spirit of the invention is not limited to any of these definitions, or to specific examples mentioned therein, but is intended to include the most general concepts embodied by these and other terms.

System Elements

FIG. 1 shows a block diagram of a storage system and a new disk to be integrated into the storage system.

Storage System and Disks

A storage system 100 includes a set of data disks 110 (already integrated into the storage system 100), at least one parity disk 120 including redundant information from which data can be reconstructed after an error, and a new disk 130 capable of being integrated into the storage system 100.

As further described below, each data disk 110 is logically divided into a set of disk blocks 111, for each of which the storage system 100 is capable of reading and writing information. Similarly, the parity disk 120 (or each of them, if there is more than one) is logically divided into a set of parity disk blocks 121, for each of which the storage system 100 is capable of reading and writing information. Similarly, the new disk 130 is logically divided into a set of new disk blocks 131, for each of which the storage system 100 is capable of reading and writing information.

In alternative embodiments, the storage system 100 may include parity disk blocks 121 distributed across more than one parity disk 120, and may include data disk blocks 111 distributed with those parity disk blocks 121 on both data disks 110 and parity disks 121. In such alternative embodiments, data disks 110 and parity disks 120 might be collectively referred to as old disks 110, and one or more of those old disks 110 might each include both data disk blocks 111 and parity disk blocks 121.

For example, not intended to be limiting in any way, the old disks 110 might include a RAID-5 system including N old disks 110, with the effect that each RAID stripe includes one parity disk block 121, and with the effect that those parity disk blocks 121 are substantially equally distributed across the old disks 110. One such example, where N=4, is shown in Table 1 below:

TABLE 1

RAID-5 System with N = 4 Old Disks

| RAID stripe | Disk 0 | Disk 1 | Disk 2 | Disk 3 |
|---|---|---|---|---|
| 0 | B0 | B1 | B2 | Parity (B0:B2) |
| 1 | B3 | B4 | Parity(B3:B5) | B5 |
| 2 | B6 | Parity(B6:B8) | B7 | B8 |
| 3 | Parity(B9:B11) | B9 | B10 | B11 |
| 4 | B12 | B13 | B14 | Parity (B12:B14) |

In this table, Bn is the nth data block 111 in the RAID array and Parity(Bi:Bj) is the parity block 121 computed for data blocks Bi through Bj. As described above, since there are N=4 disks 110, each $4^{th}$ disk block 111 is a parity disk block 121.

In such alternative embodiments, when a new disk 130 is added to the storage system 100, that new disk 130 does not (initially) include any parity disk blocks 121, but the parity disk blocks 121 on the old disks 110 are adjusted to account for the new disk blocks 131. One such example, with N=4 and one new disk 130, is shown in Table 2 below:

TABLE 2

Quasi-RAID-5 System with N = 4 Old Disks and 1 New Disk

| RAID stripe | Disk 0 | Disk 1 | Disk 2 | Disk 3 | New Disk |
|---|---|---|---|---|---|
| 0 | B0 | B1 | B2 | Parity (B0:B2, N0) | N0 |
| 1 | B3 | B4 | Parity (B3:B5, N1) | B5 | N1 |
| 2 | B6 | Parity (B6:B8, N2) | B7 | B8 | N2 |
| 3 | Parity (B9:B11, N3) | B9 | B10 | B11 | N3 |
| 4 | B12 | B13 | B14 | Parity (B12:B14, N4) | N4 |

In this table, Nn is the nth new block 131 and Parity(Bi:Bj, Nk) is the parity block 121 computed for old blocks 111 Bi through Bj and new block 131 Nk. As described above, since there are N=4 disks 110, each $4^{th}$ old block 111 is a parity disk block 121 (on the old disks 110). This is referred to herein as a "quasi-RAID-5 system." It is not a true RAID-5 system because there is no parity on the new disk.

As also further described below, each data disk 110 is associated with an extent list 112, describing which ones of the disk blocks 111 on that disk are "in use." In this context, the phrase "in use," used with regard to a particular disk block 111, indicates that the particular disk block 111 has been written to since the data disk 110 was initialized (or otherwise made empty of data). In this context, a particular disk block 111 might be said to be "in use" even if that particular disk block 111 is not in fact allocated to a particular file (or other storage system structure, such as possibly a directory or i-node). For example, this might occur if the block had been allocated to a file, then the file (and, in particular, that block) was written and then the file deleted.

The extent list 112 includes one or more data structures maintained in association with the disk 110, indicating a distinction between those disk blocks 111 which are "in use" and those which are not "in use" on that disk 110. This has the effect that use of the extent list 112 involves updating the extent list 112 as disk blocks 111 are written on that disk 110, while preserving at least the following properties even in the event of a failstop, particularly a power failure while writing to a disk:

The extent list 112 is substantially always readable.

The extent list 112 is substantially always internally consistent (that is, operations which update the extent list 112 appear substantially atomic to the storage system 100).

The extent list 112 is substantially always consistent with the set of disk blocks 111 it represents (that is, the extent list 112 is substantially always accurate regarding which disk blocks 111 are "in use" and which disk blocks are not "in use."

The extent list 122 associated with the parity disk 120 is substantially always consistent with the extent lists 112 associated with the data disks 110 and the extent list 132 associated with the new disk 130.

In one embodiment, the extent list 112 includes a set of sequences of disk blocks 111 which are in use on that disk, such as for example blocks "1-12, 15, and 17-25." The parity disk 120 is associated with its own extent list 122, similar in nature to the extent list 112. The new disk 130 is also associated with its own extent list 132, also similar in nature to the extent list 112.

After reading this application, those skilled in the art would recognize that the extent list 112 is substantially equivalent to a block map of those disk blocks 111 in use on its associated data disk 110, and is alternatively substantially equivalent to a compressed form of such a block map, such as for example a Liv-Zempel encoding of such a block map. In alternative embodiments, an uncompressed block map, or a block map compressed or otherwise represented using another technique, may be used in conjunction with or instead of the extent list 112. However, in such alternative embodiments that the properties of the extent list 112 described above, it might occur that implementation of the extent list 112 involves more effort than in preferred embodiments.

Similarly, after reading this application, those skilled in the art would recognize that the extent list 122 is equivalent to a block map of those disk blocks 121 in use on the associated parity disk 120, and is alternatively equivalent to a compressed form of such a block map, such as for one example, not intended to be limiting in any way, a Liv-Zempel encoding or other compression encoding of such a block map. In alternative embodiments, an uncompressed block map, or a block map compressed or otherwise represented using another technique, may be used in conjunction with or instead of the extent list 122.

Similarly, after reading this application, those skilled in the art would recognize that the extent list 132 is equivalent to a block map of those disk blocks 131 in use on the new disk 130, and is alternatively equivalent to a compressed form of such a block map, such as for example a Liv-Zempel encoding of such a block map. In alternative embodiments, an uncompressed block map, or a block map compressed or otherwise represented using another technique, may be used in conjunction with or instead of the extent list 132.

Moreover, after reading this application, those skilled in the art would recognize that there is no particular requirement that the extent lists 112, the extent list 122, or the extent list 132, involve the same or similar data structures (although in a preferred embodiment, all extent lists 132 involve substantially the same data structures). In alternative embodiments, these data structures might be completely different.

One feature of the data structures used for the extent lists 112, the extent list 122, and the extent list 132, is that it might occur that the degree of compression from a uncompressed block map is not sufficient to fit one of those data structures into a relatively smaller allocated section of memory or mass storage. For example, a data structure for one of the extent lists 112 might represent disk blocks 111 numbered "2-3, 5, 7, 11, 13, 17, etc.," and thus take up a substantial amount of space for that data structure. In one embodiment, the data structure for that one of the extent lists 112 might be modified to further compress it. For one example, not intended to be limiting in any way, that data structure might be modified (along with zeroing the data for those selected disk blocks) to indicate selected disk blocks 111 as being "in use" (as that phrase is described herein), with the effect of combining multiple extents listed in the data structure into a fewer number of extents, and with the effect of involving less memory or mass storage for recording or maintaining the extent list 112.

In one embodiment, those disk blocks 111 added to the extent list 112 as being "in use" are written with substantially all zero values, with the effect that associated parity disk blocks 121 need not be substantially changed.

In one embodiment, the storage system 100 includes a file system 101, preferably including a hierarchical structure of directories and files, with the effect that each file represented by the storage system 100 is associated with a directory, and each directory is associated with a parent directory, up to a root directory 102 for the hierarchical structure. The storage system 100 also includes a free list of blocks not in use by any directory or file in the file system 101, the free list being designated by a free list pointer 103.

In one embodiment, the new disk 130 includes a file system 133, similar to the file system 101, and preferably including a root directory 134. The file system 133 also includes a free list of blocks not in use by any directory or file, the free list being designated by a free list pointer 135.

In one embodiment, the storage system 100 includes an extent holding bin 104, capable of maintaining a copy of the extent list 132 associated with the new disk 130. This has the effect that both the extent holding bin 104 and a new extent list 132 for the new disk 130 are associated with the new disk 130.

Alternative Storage Systems

After reading this application, those skilled in the art would recognize that the file system 101 need not be restricted to an explicit tree structure, but for one example, not intended to be limiting in any way, might include a lattice. For one example, not intended to be limiting in any way, if Unix-style links are included, the file system 101 would have the effect that a directory or file might be associated with more than one containing directory.

Similarly, after reading this application, those skilled in the art would recognize that the storage system 100 need not be restricted to an explicit file system 101, but for one example, not intended to be limiting in any way, might include a database or database system (possibly including either a set of database objects or a set of relational tables), a set of lisp objects, or some other technique for maintaining data.

Similarly, after reading this application, those skilled in the art would recognize that the storage system 100 need not be restricted to a single technique for maintaining data, but for example, not intended to be limiting in any way, might include a plurality of distinct techniques, each appropriate to a subset of information to be maintained thereon (although in a preferred embodiment, the storage system 100 uses a substantially uniform set of data structures for each disk integrated therein).

After reading this application, those skilled in the art would recognize that the new disk 130 need not be restricted to a storage system, or to any other technique for maintaining data, that is the same as or similar to techniques included in the storage system 100. In alternative embodiments, at least in theory, the new disk 130 might include techniques substantially different from the storage system 100, or might include multiple heterogeneous techniques, only some of which are similar to techniques included in the storage system 100 (although in practice, a substantially uniform set of data structures would be preferred).

Method of Integrating New Disk

Figure 2:
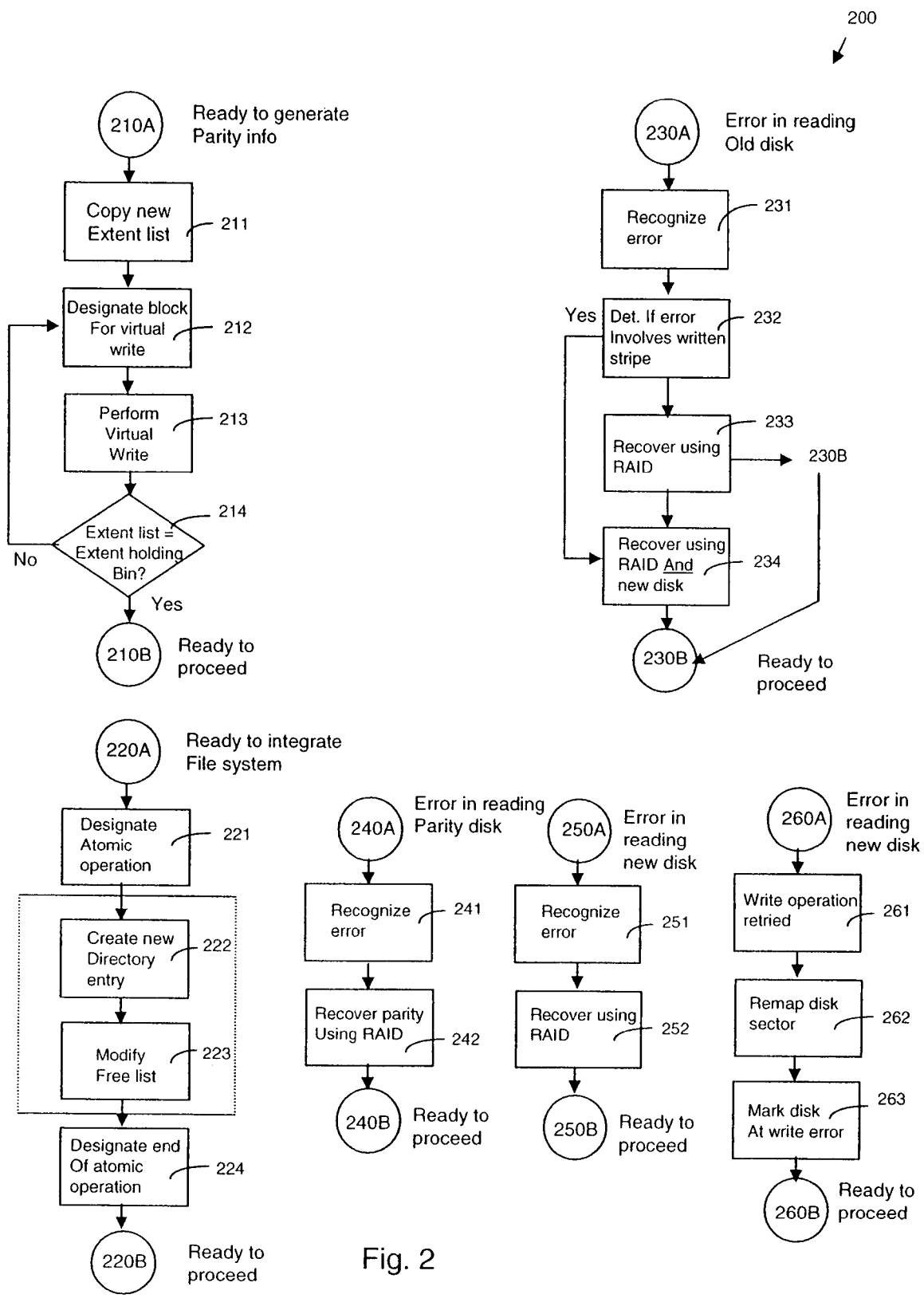
FIG. 2 shows a process flow diagram of a method of integrating a new disk into a storage system.

FIG. 2 shows a process flow diagram of a method of integrating a new disk into a storage system.

Although described serially, the flow points and method steps of the method 200 can be performed by separate elements in conjunction or in parallel, whether asynchronously or synchronously, in a pipelined manner, or otherwise. In the context of the invention, there is no particular requirement that the method must be performed in the same order in which this description lists flow points or method steps, except where explicitly so stated.

Integrating Parity Information

At a flow point 210A, the storage system 100 is ready to generate parity information integrating the new disk 130 into the storage system 100.

At a step 211, the storage system 100 copies the extent list 132 for the new disk 130 into the extent holding bin 104 (located, in one embodiment, on the new disk 130 itself), and clears the extent list 132 for the new disk 130. This has the effect that the extent list 132 and the extent holding bin 104 for the new disk 130 collectively describe the blocks that have been written (and which can therefore be read).

At a step 212, the storage system 100 designates a disk block 131 associated with the new disk 130 for which a virtual write operation is to be performed. In one embodiment, the designated disk block 131 is selected from the list of disk blocks 131 identified by the extent holding bin 104 but which is not contained in the extent list 132.

At a step 213, the storage system 100 performs a virtual write operation for the designated disk block 131 on the new disk 130. The virtual write operation includes the following sub-steps:

At a sub-step 213(a), the storage system 100 reads the parity block corresponding to the designated disk block.

At a sub-step 213(b), the storage system 100 computes new parity information for the corresponding disk block 121 of the parity disk 120. In one embodiment, the storage system 100 computes the new parity information using parity addition, that is, it computes (new parity)=(old parity) XOR (new disk data), where "XOR" is a logical exclusive-or function.

At a sub-step 213(c), the storage system 100 marks the designated disk block 131 as in use by the storage system 100 in the extent list 132 for the new disk 130.

At a sub-step 213(d), the storage system 100 atomically writes both (A) the new parity information to the corresponding disk block 121 of the parity disk 120, and (B) the new extent list 132.

This step therefore has the same effect as if the actual data of the new disk block 131 was written to the new disk 130, if the new disk 130 had been already included in the storage system 100.

At a step 214, the storage system 100 determines if the extent list 132 for the new disk 130 is equal to the extent holding bin 104. If not, the method 200 proceeds with the step 212 (again), and the steps following. If so, the method 200 continues with the flow point 210B.

At a flow point 210B, the system 100 has generated parity information integrating the new disk 130 into the storage system 100, and is ready to proceed.

Integrating File Systems

At a flow point 220A, the system 100 is ready to integrate the file system 133 included on the new disk 130 with the file system 101 included in the storage system 100.

In this flow sequence, the storage system 100 performs an atomic operation of unifying the file system 133 on the new disk 130 (including its root directory 134 and its free list pointer 135) with the file system 101 (including its root directory 102 and its free list pointer 103). In one embodiment, this atomic operation is "atomic" (that is, in the sense that there is no detectable state in which this atomic operation is only partially performed) both (a) with regard to other operations performed by the storage system 100 and (b) with regard to writing the indicated changes to any of the disks in the storage system 100. To perform this atomic operation, the storage system 100 performs the following steps.

At a step 221, the storage system 100 designates the beginning of an atomic operation that must not be interrupted. Performing atomic operations is known in the art of operating systems. For one example, not intended to be limiting in any way, designating the beginning of an atomic operation might include setting a lock.

At a step 222, the storage system 100 creates a new directory entry in the root directory 102 of the file system 101. The storage system 100 merges the file system 101 with the file system 133 by copying the pointer contained in the root directory 134 of the file system 133 on the new disk 130 into a directory of the file system 101. This has the effect of merging the directory and file entries for the file system 133 into the file system 101.

At a step 223, the storage system 100 writes, at the end of the free list for the file system 101 (pointed to by the free list pointer 103), the free list for the file system 133. This has the effect of merging the free list for the file system 133 into the file system 101.

At a step 224, the storage system 100 designates the end of the atomic operation. For one example, not intended to be limiting in any way, designating the end of an atomic operation might include releasing a lock.

This flow sequence therefore has the effect of merging the file system 133 from the new disk 130 into the file system 101 already in use by the storage system 100.

At a flow point 220B, the system 100 has integrated the file system 133 included on the new disk 130 with the file system 101 included in the storage system 100, and is ready to proceed.

Error Recovery

In one embodiment, the method 200 includes recovering from errors during integration (that is, the steps between the flow point 210A and the flow point 210B, and the steps between the flow point 220A and the flow point 220B), with the effect that the storage system 100 can concurrently access each of the ordinary disks 110 and the new disk 130 during those integration steps, while preventing the possibility of inconsistencies in the storage system 100.

1. Reading Ordinary Disks

At a flow point 230A, the storage system 100 encounters an error in reading one of the ordinary disks 110. An error in reading one of the ordinary disks 110 implies that it was not possible to recover that data using ordinary RAID operations.

In one embodiment, the storage system 100 is more aggressive than would otherwise occur with known RAID systems performing read operations from the disk. In known disk drive systems, the disk itself, as part of a RAID system, would re-attempt the read operation several times, each time waiting for a failure timeout, and then itself attempt to recover the data using ordinary RAID operations. In one embodiment, the storage system 100 recognizes the original error in the read operation, and proceeds with its own attempt to recover the data. The inventors have found this to be quicker and more efficient than known disk drive systems.

At a step 231, the storage system 100 recognizes an error in attempting to read an ordinary disk 110, while in the process of integrating the new disk 130 (that is, during the steps between the flow point 210A and the flow point 210B, or during the steps between the flow point 220A and the flow point 220B).

At a step 232, the storage system 100 determines if the error involved one of the disks in a RAID stripe for which the storage system 100 has virtually written a corresponding disk block 131 on the new disk 130. If not, that is, the error involved a disk in a RAID stripe for which the storage system 100 has not yet virtually written a corresponding disk block 131 to the new disk 130, the method 200 proceeds with the next step. If so, that is, the error involved a RAID stripe for which the storage system 100 has already virtually written the corresponding disk block 131 to the new disk 130, the method 200 proceeds with the step 234.

At a step 233 (that is, at which the error involved a RAID stripe for which the storage system 100 has not yet virtually written a corresponding disk block 111 to the new disk 130), the storage system 100 uses known RAID techniques, with the effect of performing error recovery, but excludes the new disk 130. In one embodiment, this step involves the following sub-steps:

- At a sub-step 233(a), the storage system 100 reads data from the rest of the ordinary disks 110 and from the parity disk 120. Where one or more of those rest of the ordinary disks 110 are shown by their extent lists 112 to involve a disk block 111 not yet written to, those individual ordinary disks 110 are ignored. (This description is simplified to not take into account the possibility that blocks might be cached in RAM or some other faster storage medium than disk. After reading this application, it would be clear to those skilled in the art that such alternatives are workable, are within the scope and spirit of the invention, and would not involve undue experimentation or further invention.)
- At a sub-step 233(b), the storage system 100 computes the correct data for the corresponding disk block 111 of the ordinary disk 110 for which the read operation failed. In one embodiment, not intended to be limiting in any way, the storage system 100 performs a bitwise logical XOR operation on the data read in the previous sub-step, with the effect of generating information for a disk block 111 to be written to the ordinary disk 110 for which the read operation failed.
- At a sub-step 233(c), the storage system 100 writes the computed correct data to the corresponding disk block 111 of the ordinary disk 110 for which the read operation failed.

This step has the effect that the correct data, for the corresponding disk block 111 of the ordinary disk 110 for which the read operation failed, has been recovered from other information in the storage system 100. The error having been recovered from, the method 200 proceeds with the flow point 230B.

At a step 234 (that is, at which the error involved a RAID stripe for which the storage system 100 has already virtually written a corresponding disk block 111 to the new disk 130), the storage system 100 uses known RAID techniques, with the effect of performing error recovery, but includes the new disk 130. In one embodiment, this step involves the following sub-steps:

- At a sub-step 234(a), the storage system 100 reads data from the rest of the ordinary disks 110, from the parity disk 120, and from the new disk 130 at the disk block 111 in the corresponding stripe. Where one or more of those rest of the ordinary disks 110 are shown by their extent lists 112 to involve a disk block 111 not yet written to, those individual ordinary disks 110 are ignored.
- At a sub-step 234(b), the storage system 100 computes the correct data for the corresponding disk block 111 of the ordinary disk 110 for which the read operation failed. In one embodiment, not intended to be limiting in any way, the storage system 100 performs a bitwise logical XOR operation on the data read in the previous sub-step, with the effect of generating information for a disk block 111 to be written to the ordinary disk 110 for which the read operation failed.
- At a sub-step 234(c), the storage system 100 writes the computed correct data to the corresponding disk block 111 of the ordinary disk 110 for which the read operation failed.

This step has the effect that the correct data, for the corresponding disk block 111 of the ordinary disk 110 for which the read operation failed, has been recovered from other information in the storage system 100. The error having been recovered from, the method 200 proceeds with the flow point 230B.

At a flow point 230B, the storage system 100 has encountered and handled an error in reading or writing one of the ordinary disks 110, and is ready to proceed.

2. Reading Parity Disk(s)

At a flow point 240A, the storage system 100 encounters an error in reading the parity disk 120.

At a step 241, the storage system 100 recognizes an error in attempting to read the parity disk 120, while in the process of integrating the new disk 130 (that is, during the steps between the flow point 210A and the flow point 210B, or during the steps between the flow point 220A and the flow point 220B).

At a step 242, the storage system 100 uses known RAID techniques, with the effect of performing error recovery for the parity disk 120. In one embodiment, this step involves the following sub-steps:

- At a sub-step 242(a), the storage system 100 reads data from the rest of the ordinary disks 110 in each corresponding stripe. Where one or more of those rest of the ordinary disks 110 are shown by their extent lists 112 to involve a disk block 111 not yet written to, those individual ordinary disks 110 are ignored.
- At a sub-step 242(b), the storage system 100 computes the correct data for the corresponding disk block 111 of the parity disk 120. In one embodiment, not intended to be limiting in any way, the storage system 100 performs a bitwise logical XOR operation on the data read in the previous sub-step, with the effect of generating information for a disk block 111 to be written to the parity disk 120.
- At a sub-step 242(c), the storage system 100 writes the computed correct data to the corresponding disk block 111 of the parity disk 120.

At a flow point 240B, the storage system 100 has encountered and handled an error in reading the parity disk 120, and is ready to proceed. In one embodiment, the method 200 proceeds at the flow point 210A, with the effect of continuing the operation of integrating the new disk 130.

3. Reading New Disk(s)

At a flow point 250A, the storage system 100 encounters an error in reading the new disk 130.

At a step 251, the storage system 100 recognizes an error in attempting to read the new disk 130, while in the process of integrating the new disk 130 (that is, during the steps between the flow point 210A and the flow point 210B, or during the steps between the flow point 220A and the flow point 220B).

At a step 252, similar to the step 243, the storage system 100 uses known RAID techniques, with the effect of recovering from the error detected when reading from the new disk 130. If the block on the new disk whose read failed has been integrated into parity, it is be recomputed as described in this step. If the block on the new disk whose read failed has not yet been integrated into parity, a read error is returned. In one embodiment, this step involves the following sub-steps:

- At a sub-step 252(a), the storage system 100 reads data from the rest of the ordinary disks 110 in each corresponding stripe. Where one or more of those rest of the ordinary disks 110 are shown by their extent lists 112 to involve a disk block 111 not yet written to, those individual ordinary disks 110 are ignored.
- At a sub-step 252(b), the storage system 100 computes the correct data for the corresponding disk block 111 of the new disk 130. In one embodiment, not intended to be limiting in any way, the storage system 100 performs a bitwise logical XOR operation on the data read in the previous sub-step, with the effect of generating information for a disk block 111 to be written to the new disk 130.
- At a sub-step 252(c), the storage system 100 writes the computed correct data to the corresponding disk block 111 of the new disk 130.

At a flow point 250B, the storage system 100 has encountered and handled an error in reading the new disk 130, and is ready to proceed. In one embodiment, the method 200 proceeds at the flow point 210A, with the effect of continuing the operation of integrating the new disk 130.

4. Writing to Disks

At a flow point 260A, the storage system 100 encounters an error in writing one of the disks (either an ordinary disk 110 or parity disk 120).

In one embodiment, read errors are treated differently from write errors. When a read error occurs, the block being read can be reconstructed, as described above. When a write error occurs, however, there is not a convenient and general way to tell what was actually written to the disk.

At a step 261, the storage system 100 retries the write operation several times before reporting an error. In one embodiment, this step is performed by a set of disk driver code associated with writing to the disk.

At a step 262, the storage system 100 remaps the sector of the disk where the write error occurred to another sector. This step includes the following sub-steps:

- At a sub-step 262(a), the sector where the write error occurred is marked as bad, for example, by the disk firmware.
- At a sub-step 262(b), the sector where the write error occurred is remapped to another sector, for example, by the disk firmware.
- At a sub-step 262(c) the write operation is retried from the beginning, for example by the disk driver software. If successful, the method 200 proceeds at the flow point 260A. If unsuccessful, the method 200 determines there is something seriously wrong with the disk, and continues with the next step.

At a step 263, the storage system 100 marks the entire disk where the write error occurred as bad, and removes that disk from its pool of usable disks. As part of this step, the storage system 100 informs an operator or user of this result.

The method 200 then continues at the flow point 210A.

At a flow point 260B, the method 200 has handled an error in writing one of the disks (either an ordinary disk 110 or parity disk 120), and is ready to proceed.

Alternative Embodiments

Although preferred embodiments are disclosed herein, many variations are possible which remain within the concept, scope, and spirit of the invention. These variations would become clear to those skilled in the art after perusal of this application.

- The invention is not restricted to digital content for media streams, but is generally applicable to storage systems of any kind.
- The invention is not restricted to storage systems in which the redundant information includes only parity information, but also contemplates storage systems in which the redundant information other than parity information, or in which the redundant information includes more than one bit of error-correcting information.
- In one embodiment, the storage system 100 writes data blocks into storage blocks on disk episodically, with each write episode having two stages. In a first stage, the storage system 100 writes data blocks into storage blocks in a separate region of the disk (herein sometimes called a "committal region"), concurrently for all disks, both data disks 110 and parity disks 120. The storage system 100 treats the collective act of writing to the committal regions of all disks as an atomic operation, in the sense that synchronization is used to assure that the write operation either completely succeeds or is considered to have failed, with the effect that if a system error or other failure occurs during the first stage, the storage system 100 can roll back its status to just before the first stage. In a second stage, the storage system 100 writes blocks to their respective target locations on disk. Since the write operation to the committal region is atomic, the storage system 100 can safely repeat this second stage if a system error or other failure occurs during the second stage.
- The invention is not restricted to storage systems in which the redundant information is maintained on only a single designated parity disk, such as for example in a RAID-4 system, but also includes storage systems in which the redundant information is distributed across more than one disk, such as for example in a RAID-5 system.
- The invention is not restricted to unitary systems in which the redundant information is maintained under the control of a single storage system, such as for example in a RAID system, but also includes distributed systems in which the redundant information is maintained by a plurality of substantially independent devices, such as for example a multi-device system including independent actors and cross-checking of persistent storable objects. For one example, not intended to be limiting in any way, if data can be transmitted among the plurality of substantially independent devices substantially as rapidly as it can be written to conventional disks, and if the probability of failure of one of the devices or of its being partitioned from the rest is about the same as the probability of a single disk failure, the invention might be applicable to such systems.

After reading this application, those skilled in the art will recognize that these alternative embodiments and variations are illustrative and are intended to be in no way limiting.

After reading this application, those skilled in the art would recognize that the techniques described herein provide an enabling technology, with the effect that heretofore advantageous features can be provided that heretofore were substantially infeasible.

The invention claimed is:

1. A method, including steps of
coupling a storage system including at least some existing data content and at least some existing redundant information relevant to said data content with a new storage device including new data content;
adjusting usage information associated with said storage system to include selected portions from said new storage device as being available for use with said storage system,
said steps of adjusting usage information including steps of
adjusting at least some of said existing redundant information responsive to said selected portions of said new data content; and
updating said storage system to reflect that said selected portions of said new data content are available for use by said storage system.

2. A method as in claim 1, including steps of
detecting an error associated with an operation performed by said storage system; and
computing information associated with at least one storage block in a stripe associated with said error.

3. A method as in claim 2, wherein the steps of computing include steps of adjusting a set of redundant information for the stripe associated with said error.

4. A method as in claim 1, including steps of optionally writing to said new storage device one or more of the following:
information responsive to file system operations performed with regard to said new storage device;
information responsive to one or more sets of blocks associated with said new storage device;
information responsive to updating one or more file directories associated with said new storage device;
information responsive to creating, deleting, modifying, or updating one or more files associated with said new storage device.

5. A method as in claim 1, including steps of
concurrently with said steps adjusting usage information, conducting one or more file system operations using said storage system;
whereby said new data content is available for those file system operations without substantial delay after said steps of adjusting.

6. A method as in claim 5, wherein each such file system operation is performed atomically.

7. A method as in claim 5, wherein said steps of adjusting are performed concurrently.

8. A method as in claim 1, including steps of
integrating a file system associated with said new storage device into said storage system, the file system including at least a set of files and a set of free disk blocks; and
whereby operations for said file system need not distinguish between said new storage device and a set of existing storage devices already integrated into said storage system.

9. A method as in claim 8, wherein said steps of integrating a file system include steps of designating at least some of those free disk blocks as parity blocks.

10. A method as in claim 1, including steps of
maintaining information representative of a first set of blocks in use by said new storage device;
maintaining information representative of a second set of blocks associated with said new storage device and for which either (A) said steps of adjusting information have been performed, or (B) said blocks have been written to the storage device since said storage device was added to the storage system;
whereby said steps of adjusting information are deemed substantially complete when said first set of blocks is substantially included in said second set of blocks.

11. A method as in claim 10, including steps of
detecting an error associated with an operation performed by said storage system; and
when said error is associated with content in said storage system, computing information associated with at least one storage block in a stripe associated with said error;
whereby, when stripe does not include one block of said first set of blocks in use by said new storage device, but said one block is included in said second set of blocks for which said steps of adjusting have been performed, content associated with said error is recoverable by said storage system without content from said new storage device; and
whereby, when said stripe includes one of said first set of blocks in use by said new storage device, but said one block is not included in said second set of blocks for which said steps of adjusting have been performed, content associated with said error is recoverable by said storage system using content from said new storage device.

12. A method as in claim 11, wherein the steps of computing include steps of adjusting a set of parity information for the stripe associated with said error.

13. A method as in claim 10, including steps of
detecting an error associated with an operation performed by said storage system; and
wherein said steps of maintaining information representative of either said first set of blocks or said second set of blocks are at least partially responsive to said error.

14. A method as in claim 10 including steps of maintaining information representative of a third set of blocks associated with said storage device and for which at least one storage system operation has been performed.

15. A method as in claim 10, including steps of
detecting an error associated with an operation performed by said storage system; and
wherein said steps of adjusting are at least partially repeated in response to either (1) a nature of said error, or (2) a difference between said first set of blocks and said second set of blocks.

16. A method as in claim 1, wherein
said storage system includes one or more existing storage devices including a set of existing storage blocks, said existing data content being associated with a first set of said existing storage blocks and said redundant information being associated with a second set of said existing storage blocks;
said new storage device includes one or more new storage blocks including said new data content;
wherein said steps of adjusting redundant information include steps of
writing to said existing storage blocks including redundant information to be consistent with said new storage blocks.

17. A method as in claim 16, including steps of
maintaining information regarding a first set of said new storage blocks said include data content;
maintaining information regarding a second set of said new storage blocks for which said steps of adjusting usage information have been performed;
repeating said steps of adjusting usage information until that first set is substantially included in said second set.

18. A method as in claim 1, including steps of
providing substantially immediate access to said selected portions from said new storage device, in response to said steps of adjusting usage information, to devices having access to that storage system.

19. A method as in claim 18, wherein
said steps of providing access are performed for at least some of said new data content
before said steps of adjusting usage information are performed for all of said new data content.

20. A method as in claim 1, wherein
said new storage device includes content in a format maintained by said storage system,
before said storage device is coupled to said storage system.

21. A method as in claim 1, wherein
said storage device includes at least a set of files and a set of free storage blocks;
and including steps of
concurrently integrating said set of files and said set of free storage blocks into said storage system.

22. A method as in claim 1, wherein
said steps of adjusting redundant information include steps of
selecting a stripe of storage blocks to include one or more of said selected portions from said new storage device and one or more storage blocks of said existing redundant information; and
performing, for said storage system, steps associated with writing content to the storage blocks of said existing redundant information for said selected stripe.

23. A computer-readable medium having computer-executable instructions for performing a method comprising:
coupling a storage system including at least some existing data content and at least some existing redundant information relevant to that data content with a new storage device including new data content;
adjusting usage information associated with said storage system to include selected portions from said new storage device as being available for use with said storage system,
said adjusting usage information including adjusting at least some of said existing redundant information responsive to said selected portions of said new data content; and
updating said storage system to reflect that said selected portions of said new data content are available for use by said storage system.

24. The computer-readable medium of claim 23, wherein
said storage system includes one or more existing storage devices including a set of existing storage blocks, said existing data content being associated with a first set of said existing storage blocks and said redundant information being associated with a second set of said existing storage blocks;
said new storage device includes one or more new storage blocks including said new data content;
wherein said adjusting redundant information include writing to said existing storage blocks including redundant information to be consistent with said new storage blocks.

25. The computer-readable medium of claim 24, further comprising:
maintaining information regarding a first set of said new storage blocks that include data content;
maintaining information regarding a second set of said new storage blocks for which said adjusting usage information has been performed;
repeating said adjusting usage information until said first set is substantially included in said second set.

26. The computer-readable medium of claim 23, further comprising:
providing substantially immediate access to said selected portions from said new storage device, in response to said adjusted usage information, to devices having access to said storage system.

27. The computer-readable medium of claim 26, wherein
said providing access is performed for at least some of said new data content before said usage information is adjusted for all of said new data content.

28. The computer-readable medium of claim 23, further comprising:
concurrently integrating a set of files and a set of free storage blocks from said storage device into said storage system.

29. The computer-readable medium of claim 23, wherein
said adjusting redundant information comprises:
selecting a stripe of storage blocks to include one or more of said selected portions from said new storage device and one or more storage blocks of said existing redundant information; and
directing said storage system to write content to the storage blocks of said existing redundant information for said selected stripe.

* * * * *